Dec. 16, 1958  A. N. BUTZ, JR  2,865,015
APPARATUS AND METHOD FOR ECHO RANGING
Filed July 14, 1944  6 Sheets-Sheet 4
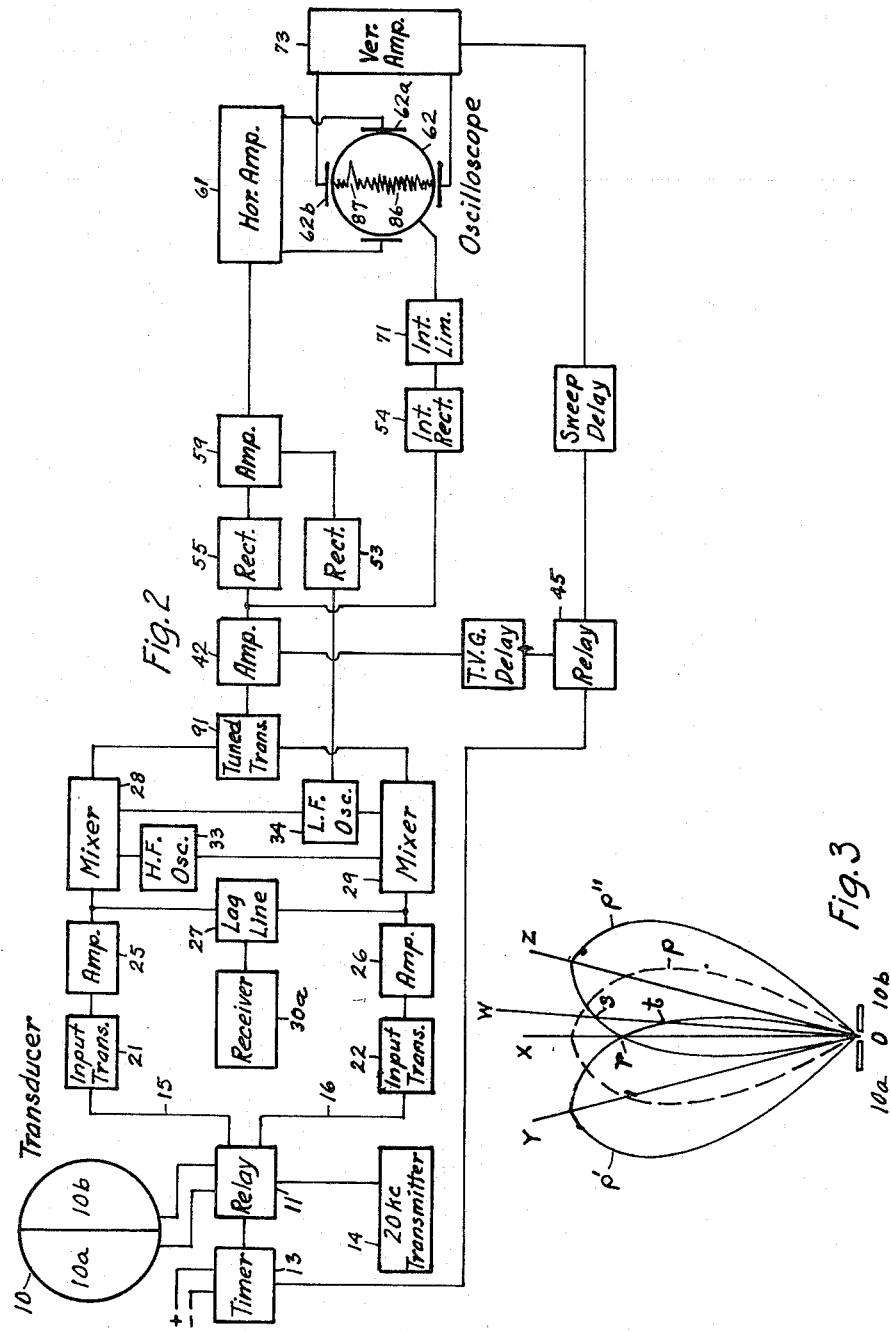
INVENTOR
A. Nelson Butz, Jr.
BY
ATTORNEY Dec. 16, 1958 A. N. BUTZ, JR 2,865,015
APPARATUS AND METHOD FOR ECHO RANGING
Filed July 14, 1944 6 Sheets-Sheet 5
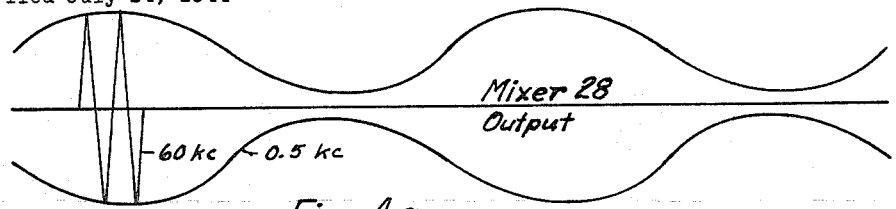
Fig. 4a
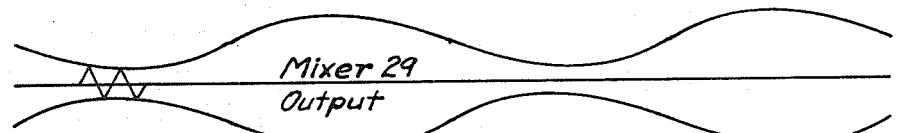
Fig. 4b
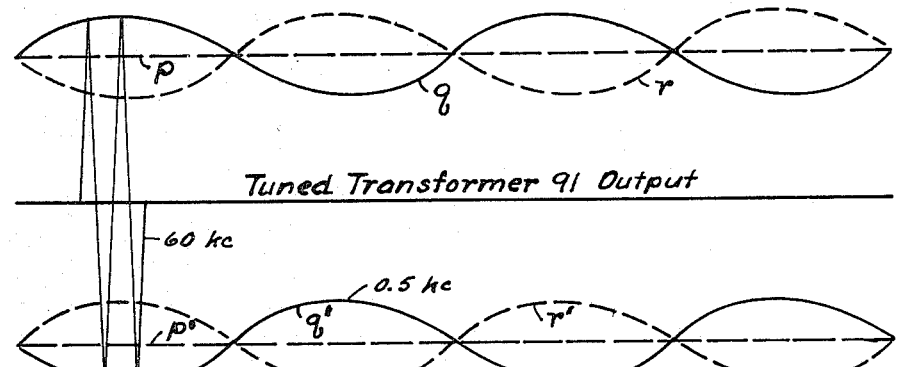
Fig. 4c
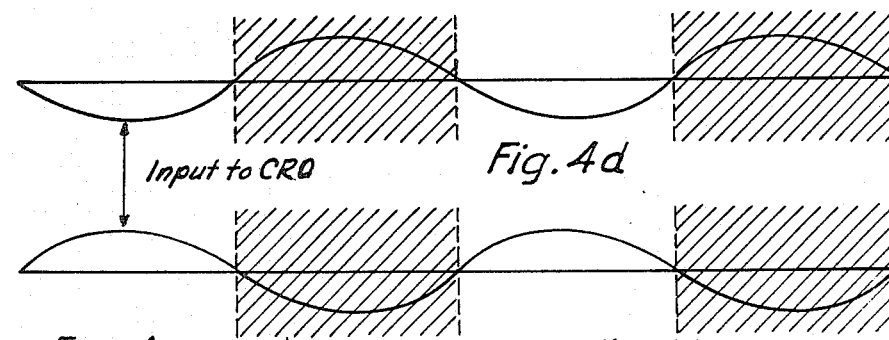
Fig. 4d
Fig. 4e
INVENTOR
A. Nelson Butz, Jr.
BY
ATTORNEY Inventor
A. Nelson Butz, Jr.
By Ralph L. Chappell
Attorney

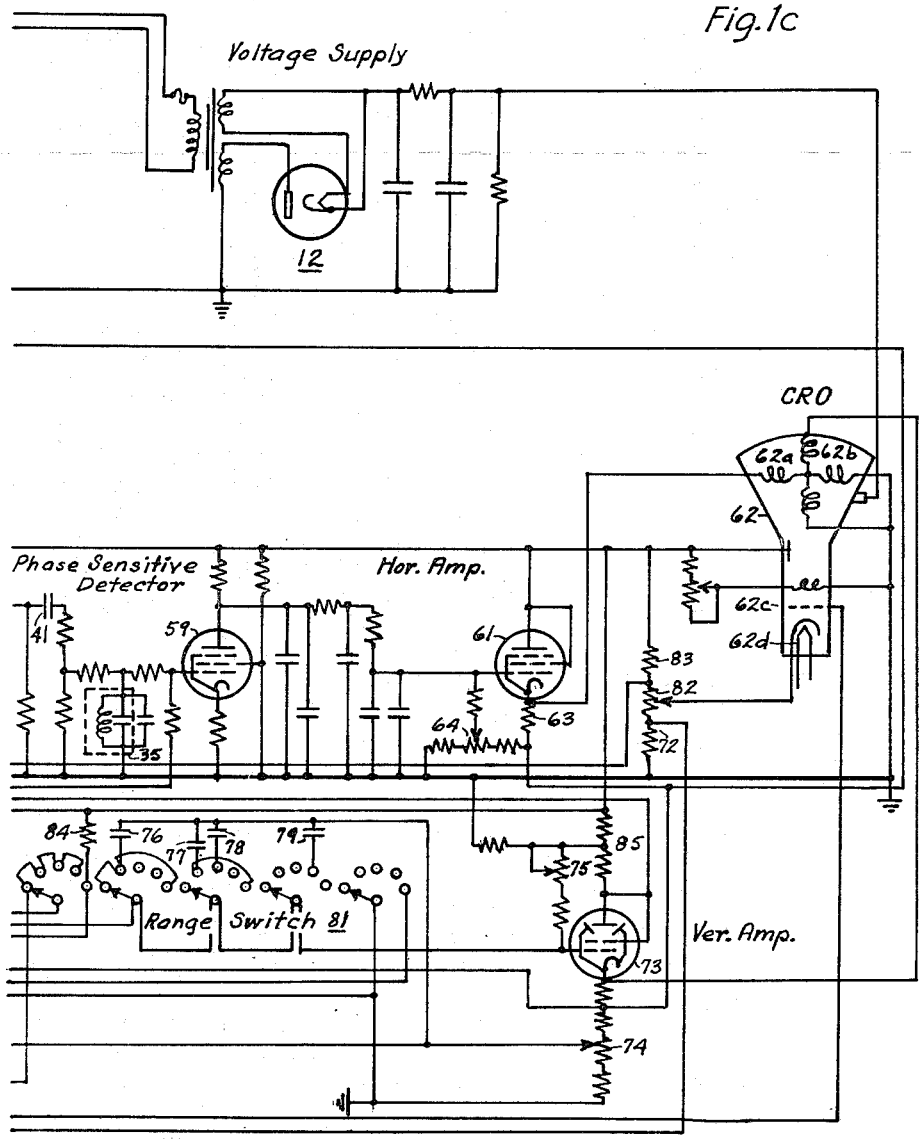

2,865,015

APPARATUS AND METHOD FOR ECHO RANGING

Arthur Nelson Butz, Jr., Maplewood, N. J., assignor to the United States of America as represented by the Secretary of the Navy Application July 14, 1944, Serial No. 544,986

9 Claims. (Cl. 340—6)

This invention relates to underwater target detection apparatus and in particular to a novel and improved device which is peculiarly adapted for use in conjunction with conventional underwater echo ranging equipment in order to provide an operator with more accurate information regarding the bearing of the target.

In conventional underwater echo ranging equipment, intermittent pulses of compressional wave energy, usually of supersonic frequency, are projected from a transducer, preferably of the type having magnetostrictive or piezo electric elements, which may be carried by a vessel below the water line. The design characteristics of the transducer are such that the energy is projected therefrom in a relatively narrow conical beam.

When such a pulse of wave energy strikes an underwater target such as a submarine, it is reflected or echoed back to the transducer (which now acts as a receiver) to actuate a visual and/or aural indicator in the receiving apparatus. The operator by noting the bearing of the transducer at which an echo is received will know that a target lies somewhere along such bearing. Since the speed of supersonic wave energy in water is substantially constant, the range of such target may be calculated from the time required for the pulse of energy to reach the target and return to the transducer. The transducer is mounted for rotation and the operator is thus able to search the underwater area for a target such as an enemy submarine throughout a complete circle.

The type of transducer construction currently used for underwater echo ranging apparatus has a directivity pattern, the main lobe of which is relatively flat in the area of maximum sensitivity. Because of this, an operator often has considerable difficulty in finding the exact bearing at which the reflected pulse echo is received at maximum signal strength, such bearing representing the true bearing of the target relative to the transducer.

Hence the present technique employed by operators to obtain an echo of maximum intensity is to train the transducer to the right until the echo is lost on that side of the target, then to the left until the echo is lost on the other side of the target. Noting the echo drop-off bearings for both right and left swings of the transducer, the correct bearing of the target will obviously be the mean between the two.

The above-operating procedure takes considerable time and it is the general object of this invention to provide a system in which the bearing of an underwater target may be accurately ascertained in a minimum of time.

In this improved system, intermittent pulses of compressional wave energy, preferably of supersonic frequency, are projected in beam form from the transducer as described above. In receiving the returning echo, however, the magnetostrictive or piezo electric elements of the transducer (which then is acting as deceiver) are split vertically into two parts.

With the transducer elements split into two parts such as parts A and B, their electrical outputs, if combined directly, would give a directivity pattern of that of the two combined into a larger unit with a single sensitivity face. However, in the improved arrangement, the output from half A is lagged in phase and combined with the output from half B with no lag. The directivity pattern then corresponds approximately to the pattern which would be obtained were half A to be set back in space from half B and the outputs of halves A and B combined directly. The result of introducing this phase shift is to shift the axis of the principal lobe of the overall directivity pattern from the perpendicular to the face of the transducer halves A and B. To state it in another manner, the result of introducing phase shift into one half is equivalent to rotating the active face of the transducer slightly in one direction from the bearing at which the energy pulse was projected from the transducer.

In a similar manner, the output from half B is lagged in phase and combined with the output from half A with no lag. The directivity pattern then corresponds approximately to the pattern which would be obtained were transducer half B set back in space from half A and the outputs from halves A and B combined directly. The result of introducing this latter phase shift is to shift the axis of the principal lobe of the overall directivity pattern in the opposite direction from the perpendicular to the face of the transducer.

Both sets of connections of the halves A and B can exist simultaneously and thus give the effect of two divergent directivity patterns which overlap each other. By comparing the combined amplitude of the outputs of half A lagged and half B with that of half B lagged and half A, an accurate measure of the angle from which the echo pulse is received can be obtained. If the pulse is coming from a direction perpendicular to the active face of the transducer, the amplitudes of the output signals in both output circuits will be the same. However, if the pulse is coming from a direction which is at an angle to the face of the transducer, the amplitude of the signal in one of the output circuits will be greater than the amplitude of the signal in the other circuit.

Thus, when an echo pulse from an underwater target is picked up on the transducer, the operator may continually ascertain very accurately the relative bearing of the target relative to the transducer by so training the transducer that the amplitudes of the signals in both output circuits are maintained at an equal level.

In the preferred embodiment, the respective amplitudes of the signals in the two output circuits are compared by obtaining their electrical difference and utilizing this latter quantity to effect a deflection of the beam spot on the screen of a cathode ray oscilloscope either to the right or left from the screen center, as the case may be. However, other means of comparison may be utilized.

A primary object of this invention is therefore to provide a novel system for ascertaining the bearing of an underwater target relative to a transducer by simultaneously establishing electrically a pair of overlapped direction sensitive patterns in the transducer elements and comparing the relative amplitudes of the signal strength of a received pulse in both patterns.

A more specific object is to provide a system for accurately ascertaining the bearing of an underwater target relative to a transducer by dividing the transducer elements vertically into two equal sections (equivalent then to two closely spaced separate transducers) to thereby provide two output channels, connecting a phase shifting network between the two channels so that an equal degree of phase shift may be introduced in each of the channels to thereby establish signal strengths in each of the channels which are equivalent to a simultaneous shift in the principal lobe of the directivity pattern of the transducer both left and right from the perpendicular to the face of the transducer, the shifted lobe patterns being overlapped, and comparing the amplitudes of the signal strengths in each of the output channels on a cathode ray oscilloscope.

Another object is to provide a system as described in the immediate preceding paragraph in which the signals in each of the output channels are converted to different frequencies and then transmitted simultaneously through a common amplifier channel to which the principle of time varied gain is applied. This feature lowers the gain in both output channels equally for a brief period immediately following the projection of the pulse from the transducer in order that the signals in each of the channels caused by reverberation will not produce too great a deflection of the beam spot on the screen of the cathode ray tube, thereby making any spot deflection due to a direct echo stand out predominantly on the screen.

Another object is to provide a circuit in which the signals in each of the output channels are modulated by high and low frequencies. A resulting frequency is selected and transmitted through a common amplifier channel to which the principle of time varied gain is applied. The signals are detected in such a manner that the polarity is dependent upon the relative phase of signal in each input channel. This polarity is applied to the sweep circuits of a cathode ray oscilloscope to indicate the bearing of the target.

Another object of the invention is to provide a target detecting system of the class described wherein an operator may observe on an oscilloscope screen the compressional wave energy emitted from an underwater target such as the rotating propellers of a submarine.

These and other objects of the invention will become more apparent from the following detailed description when considered with the accompanying drawings in which:

Figs. 1a, 1b and 1c is a schematic diagram in three parts showing the circuit arrangement of the elements used to accomplish the invention;

Fig. 2 is a simplified diagram showing in block form the principal elements of the circuit in Figs. 1a, 1b and 1c.

Fig. 3 is a view showing the two overlapped directivity patterns produced by the arrangement shown in Figs. 1a, 1b and 1c.

Figs. 4a to 4e illustrate the form of the electrical potentials in various parts of the comparison circuit.

This invention is an improvement over that disclosed in application Serial No. 546,842, filed July 27, 1944, entitled Apparatus for Determining the Direction of Underwater Targets, now Patent No. 2,666,192.

*Analysis of modulation system*

A simplified analysis applicable to two equal point microphones will here be presented. The results are readily extended to a projector consisting of two identical halves, since the difference in phase of the output of the two halves is, in this case, the same for the two points. The separation of the points will be the distance between corresponding points in the identical halves. For such a projector, the amplitude of the output of each half will be a function of the angle of incidence and, hence, of the phase angle $\theta$. In order to extend the results for two points, it is only necessary to multiply the formulas by the pressure pattern of one half of the projector (expressed in terms of the phase angle $\theta$). It is to be observed that a split circular projector does not consist of two identical halves in the sense described above, since corresponding points in the two halves are not equally spaced. However, the results for a split circular projector will not differ in important respects from those for a split square or rectangular projector or for a pair of points. It is assumed that the output voltages of the two halves or microphones are equal in amplitude; the case of unequal amplitudes, which is rather easily handled with the square law detection, becomes very complicated with linear detection.

Figure 1A:
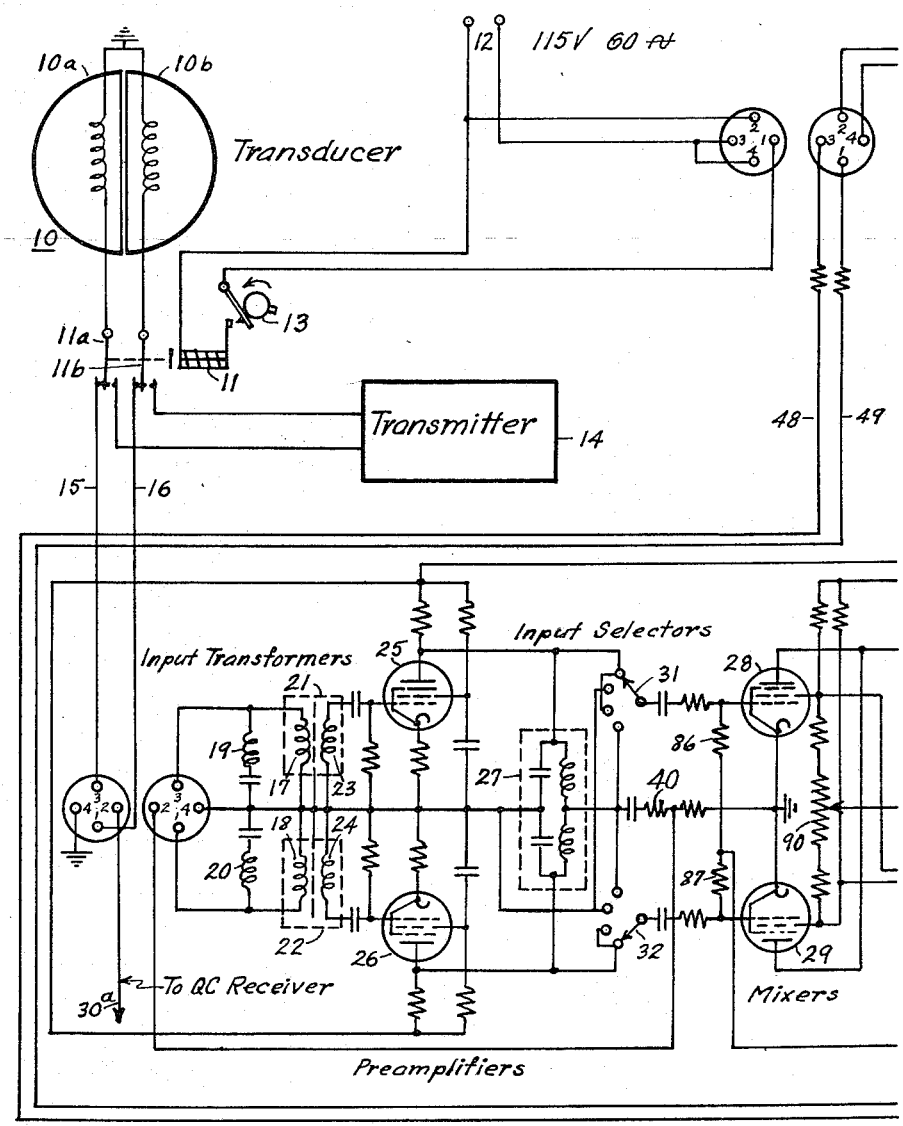
Figure 1B:
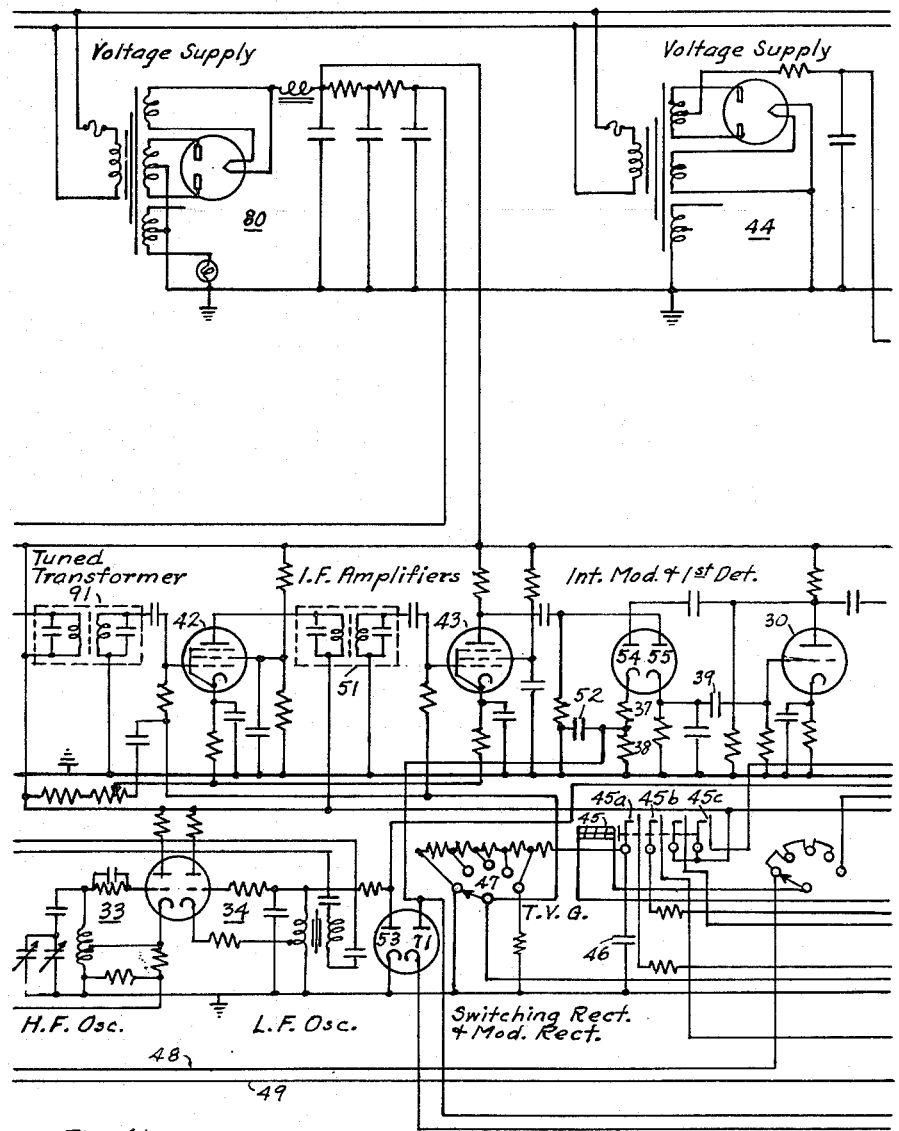
Figure 5:
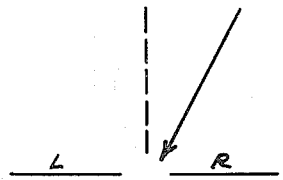
Figs. 5 to 9 are explanatory of the mathematical development.

Fig. 5 shows sound striking the two microphones at an angle to the line joining them. For the voltage output of the two halves, there results:

Left half: $\cos(wt - \theta/2)$      (1)
Right half: $\cos(wt + \theta/2)$      (2)

Here $\theta$ is the difference in phase of the two sides. The output of R is lagged by an angle B and combined with L; and L is lagged by B and combines with R. The results can be expressed by:

Left channel:
$$\cos(wt - \theta/2 + B/2) + \cos(wt + \theta/2 - B/2) = 2\cos\frac{\theta - B}{2}\cos wt \quad (3)$$

Right channel:
$$\cos(wt - \theta/2 - B/2) - \cos(wt - \theta/2 + B/2) = 2\cos\frac{\theta - B}{2}\cos wt \quad (4)$$

The left channel is modulated with $(1 + M\cos w_m t)$ and the right channel with $(1 - M\cos w_m t)$, where M is the degree of modulation, and the two channels are combined to give the difference, i. e.

$$2\cos wt\left[\cos\frac{\theta - B}{2}(1 - M\cos w_m t) - \cos\frac{\theta + B}{2}(1 - M\cos w_m t)\right] =$$

$$4\cos wt\,[\cos\theta/2\,\cos B/2 + M\sin\theta/2\,\sin B/2\,\cos w_m t] \quad (5)$$

This signal is passed into a linear detector whose output is the amplitude of the envelope:

$$f(w_m t) = \cos\theta/2\,\cos B/2 + m\sin\theta/2\,\sin B/2\,\cos w_m t \quad (6)$$

For small values of $\theta$, for which $$\tan\theta/2 < \frac{1}{M}\cotan B/2 \quad (7)$$

Figure 6:
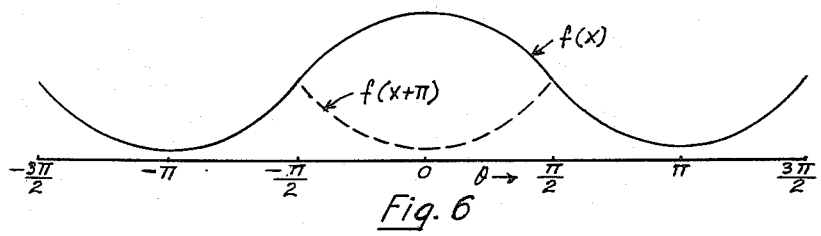

Equation 5 is less than 100 percent modulated and the amplitude (Equation 6) is as shown in Fig. 6.

On the other hand, when $$\tan\theta/2 > \frac{1}{M}\cotan B/2 \quad (8)$$

Figure 7:
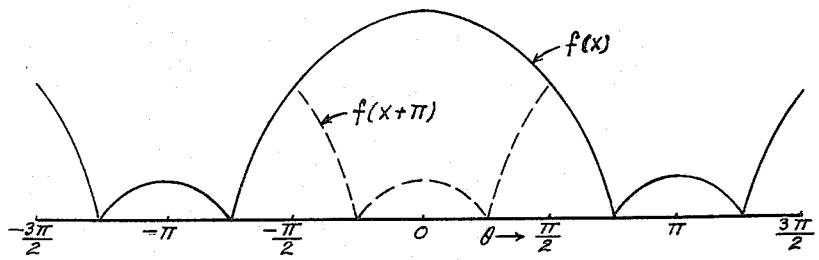

Equation 5 is over-modulated and Equation 6 has the appearance shown in Fig. 7.

Since interest is only in the time-varying portion of Equation 6, there may be written for the signal $$f(x) - \frac{1}{2\pi}\int_{-\pi}^{\pi} f(x)dx \quad (9)$$

Where $x$ has been written for $w_m t$, the signal, Equation 9, is now put into a phase-sensitive rectifier which effectively takes the average from $-\pi/2$ to $\pi/2$, since it is insensitive over the other half cycle. The result is:

$$\frac{1}{2\pi}\int_{-\pi/2}^{\pi/2} f(x)dx - \frac{1}{4\pi}\int_{-\pi}^{\pi} f(x)dx =$$

$$\frac{1}{4\pi}\int_{-\pi/2}^{\pi/2}[f(x) - f(x + \pi)]dx \quad (10)$$

Figure 8:
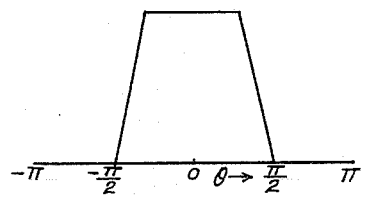

Since $f(x)$ has a period of $2\pi$, the integral of Equation 10 reverses sign when $x$ is increased by $\pi$. The substitution $x \to x + \pi$ in $f$ is the same as $\theta \to -\theta$. Consequently the D. C. output, Equation 10, of the phase-sensitive rectifier is an odd function of $\theta$. Fig. 8 shows a plot of $f(x) - f(x + w)$, corresponding to Fig. 6.

When Equation 7 holds, the value of Equation 10 becomes $$\frac{M}{4\pi} \sin \theta/2 \sin B/2 \int_{-\pi/2}^{\pi/2} 2 \cos x\, dx = \frac{M}{r} \sin \theta/2 \sin B/2 \quad (11)$$

When Equation 8 applies, Equation 11 is replaced by $$\frac{M}{\pi}\int_0^\sigma \cos \theta/2 \cos B/2\, dx + \frac{M}{\pi}\int_\sigma^{\pi/2} \sin \theta/2 \sin B/2 \cos x\, dx =$$

$$\frac{M}{\pi} \sin \theta/2 \sin B/2 [\sigma \cos \sigma + 1 - \sin \sigma] \quad (12)$$

where $\sigma$ is defined by $$\sigma = \cos^{-1}\left(\frac{1}{M} \cotan \theta/2 \cotan B/2\right)$$

Figure 9:
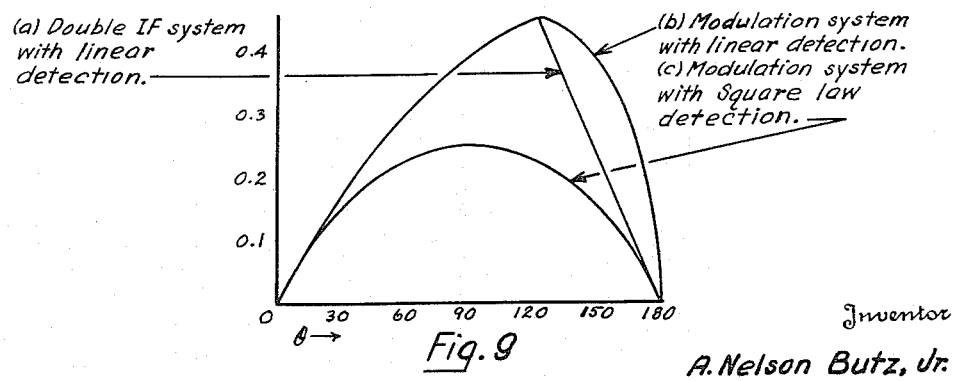

In Fig. 9 are shown the three BDI traces expected with the three systems for an angle $B = 60°$.

(a) Double I. F. system with linear detection
(b) Modulation system with linear detection
(c) Modulation system with square law detection $M = 1$ It will be noted that curves (a) and (b) are identical up to the point $$\theta = \pi - B = 120°$$

Beyond this point, they begin to differ slightly. Experimentally, it has been found that this difference is too small to be detected. On the other hand, system (c) shows a marked departure from (a) and (b). The form of (c) is independent of B. The first portion of (a) and (b) is more nearly linear than the corresponding part of (c); this may prove an important advantage in some applications.

Although systems (a) and (b) are equivalent in echo-ranging where a single frequency is used, it has been found in practice that they give different results when trained on noise. System (a) gives good indication on noise, while system (b) gives large random indications for $M \leq 1$. When M is made appreciably larger than unity, this difference disappears. The difficulty with (b) at low modulation has been attributed to a spread in frequency of the noise, which represents modulation at the same frequency as $w_m$ (500 cycles). On the other hand, the modulation present in reverberation corresponds to frequencies no higher than about 50 cycles; these, hence, give no trouble.

In this invention, the modulators are designed to give a strongly overmodulated output in order to overcome the difficulty discussed in the preceding paragraph. In fact, one may consider the input signals to be switched on and off at the modulation frequency rather than modulated in the ordinary sense. The envelope of the modulator outputs, however, is more nearly triangular than square wave, as it would be with true switching. The analysis of the modulation system given above is not materially altered for this case; in particular the same BDI indication is obtained as far as the peak in Fig. 8.

Referring now to the drawings, a transducer is shown at 10. The transducer's active elements which may be either of the piezo electric or magnetostrictive type are of conventional construction. The electrical connections from the elements comprising the left half 10a and those comprising the right half 10b are brought out separately.

A relay 11, the winding of which is energized intermittently from a power source 12 through timing contactor 13, functions when energized to momentarily connect the output at supersonic frequency from transmitter oscillator 14 through its contacts 11a, 11b to the transducer halves 10a and 10b. The electrical energy imparted to the transducer elements which is a pulse of very short duration causes a pulse of compressional wave energy to be projected through the water.

The dimensions of the transducer 10 relative to the frequency of the transmitter oscillator 14 are such that the pulse is projected normal to the active face of transducer 10 along axis Ox and its transmitting pattern has a major lobe such as pattern p in Fig. 3, with its maximum along axis Ox.

After the pulse of compressional wave energy is projected, contacts 11a and 11b of relay 11 open to connect the transducer halves 10a and 10b to separate output channels 15 and 16.

Should the projected pulse strike an underwater target and be reflected, the pulse echo will return to the face of the transducer 10 and mechanically excite the transducer elements thereby generating electromotive forces therein. The voltage output from the elements in transducer half 10a feeds into output channel 15 and the output from the elements of transducer half 10b into channel 16.

The output voltages in channels 15 and 16 which should be equal, or nearly so, feed into the primary windings 17, 18 of input transformers 21, 22 which are similar. The primaries 17 and 18 are tuned with elements 19 and 20 respectively.

The voltages appearing across the secondary windings 23, 24 of transformers 21, 22, which are substantially of equal amplitudes and at the same phase are impressed on the grids of input amplifiers 25, 26, respectively.

Connected across the output circuits from amplifiers 25, and 26 is a phase shifting network or lag line 27, the function of which is to delay the voltage output from one half of transducer 10 relative to that from the other half at the grid of mixer tubes 28 and 29. Lag line 27 may consist of several sections of constant K low pass filter, properly terminated, and designed to be operated at frequencies well below the cut-off frequency.

It will now be seen that the two halves 10a, 10b of transducer 10 are connected in parallel through transformers 21, 22 and amplifiers 25, 26 to the mixers 28 and 29 respectively, with lag line 27 connected across the inputs to the grid circuits of the two mixers. Therefore, mixer 28 receives normal phase current from half 10a of transducer 10 and also receives a lagging current from half 10b of transducer 10 via lag line 27. The resultant current into mixer 28 corresponds to a directional receiving pattern $p'$ (in Fig. 3), the axis of the principal lobe of which is shifted from the perpendicular Ox to axis Oy.

Similarly, the resultant input current to mixer 29 corresponds to directional pattern $p''$, the axis of which is shifted to the other side of the perpendicular Ox to axis Oz.

As is apparent in Fig. 3, the two mixers 28, 29 get equal currents for inputs along axis Ox, the intensity of such currents being equal to vector Or. But with an input from another direction such as along axis Ow, the intensity of the current in mixer 28 (pattern $p'$) corresponds to the vector Ot and the intensity of the current in mixer 29 (pattern $p''$) corresponds to the vector Os. Accordingly the input to mixers 28, 29 will differ in intensity for input signals received along an axis like Ow at one side of the perpendicular axis Ox.

The output from the mid point of lag line 27 is drawn alike from both halves 10a and 10b of transducer 10 and therefore corresponds to directional pattern p in Fig. 3 with its axis Ox perpendicular to the face of the transducer 10. Accordingly, an output from the mid point of lag line 27 may be connected through resistance 40 to an aural and/or visual receiver 30a. Receiver 30a is of conventional QC design and therefore has not been illustrated since its construction per se forms no part of this invention.

Connected between lag line 27 and mixer tubes 28, 29 are commonly operated input selector switches 31, 32, the functions of which will be later described.

In order to compare the intensities of the outputs from the transducer in the two channels 15, 16, a cathode ray oscilloscope is utilized. Its connection in applicant's system will be described in detail hereinafter. Suffice to say here, however, it is well known in the art and that the cathode ray oscilloscope possessses a relatively small useful working range between excessive and insufficient deflection limits.

The lower limit may be determined by the focus or, if the focus is extremely good, by the distance from the screen of the oscilloscope to the operator. Too small a deflection of the cathode ray beam spot will produce too small an angular movement for proper definition in his visual system. Obviously, the upper useful limit is determined by the point where the beam spot is deflected beyond the edge of the tube screen.

While the working range of the cathode ray oscilloscope is therefore relatively small, the extremes of intensity level of the outputs in channels 15, 16, as encountered in practice, are large. It is, therefore, desirable to employ some sort of automatic volume control in the output amplifier system. Applicant has found that automatic volume control of the outputs operating as a function of time is preferable, this being known as time varied gain. Thus for pulse echoes from nearby objects, corresponding to short elapsed times, which echoes are at a comparatively high intensity level and are commonly referred to as reverberation, the gain will be low. The gain is allowed to rise, however, at a predetermined rate so that a greater gain will be available for the weaker, more distant pulse echoes returning from more distant objects such as enemy submarines.

However, with time varied gain as an accepted requirement, employment of it successfully requires its application equally to the two output channels 15, 16. It is, of course, possible to employ cut-off amplifier tubes of the same type and characteristics in the two channels and apply an equal amount of time varied gain control voltage simultaneously to each. If such tubes are well matched, the gains will drop by the same amount. If, however, such tubes do not have identical characteristics, a mismatch of gain in the two channels will result with corresponding incorrect indication of bearing of the target. In the present novel system, the problem of matching in the amplifier tubes in the two separate output channels is overcome by combining the outputs in the two channels in a common channel to which a time varied gain voltage is applied, thereby applying an equal amount of time varied gain to each of the outputs.

In order to reduce the gain in the output voltages in both output channels for a brief period immediately following the projection of a pulse from transducer 10 so that the output voltages produced by reverberation, as distinguished from a true echo, will not produce too great a deflection of the beam spot on the screen of the cathode ray tube, time varied gain is then applied to amplifiers 42 and 43 to control the gain of the latter as a function of time. That is, a time varied gain voltage is applied on the control grids of tubes 42 and 43 from a negative voltage power supply through contacts 45a of relay 45, condenser 46, and attenuator 47.

Relay 45 is energized through branch conductors 48, 49 (at the same time that relay 11 is energized) and when so energized, applies through contacts 45a, a high negative voltage thus charging condenser 46. The negatively charged condenser 46 puts a high negative voltage on the input grids of amplifiers 42 and 43, thereby greatly reducing their gain at and immediately after the pulse is projected from transducer 10. This negative charge on condenser 46 gradually leaks off through attenuator 47, thereby gradually reducing the negative voltage on the input sides of amplifiers 42, 43, and gradually restoring the normal gain characteristics of these amplifiers.

From the input selectors 31 and 32, the two currents to be compared, each assumed by way of example to be a frequency of 20 kc., are fed to the input grids of the mixing tubes 28 and 29. These mixers have two other inputs, namely, 80 kc. current from the oscillator 33 and 0.5 kc. current from the oscillator 34.

Oscillator 33 feeds onto the control grids of mixer tubes 28 and 29 through the junction of balance resistors 86 and 87. Oscillator 34 feeds onto the screen grids through balancing resistor 90.

Of the various possible modulation products, attention is fixed on that one which has a difference frequency 80–20=60 kc., modulated at the frequency 500. The imposed electromotive force from oscillator 34 at this last mentioned frequency is preferably adjusted to bring the modulation envelope down to zero once in each cycle of the 500 cycles per second for optimum operating conditions, however, for purposes of illustration this preferable adjustment is not shown in Figures 4a and 4b.

Figure 4a illustrates the envelope modulated at 500 cycles frequency within which the current of 60 kc. rises and falls in intensity. If it be assumed that Figures 4a is for the upper channel through the mixer 28, and the modulating electromotive force from oscillator 34 is applied in opposite phase in the two mixers 28 and 29; therefore, the correposnding modulation envelope for the mixer 29 is as shown in Figure 4b. It will be noted that the two channels are of opposite phase and that they vary in comparative intensity in proportion to the variation of intensity of the signals generated in the two parts 10a and 10b of the transducer.

The two currents represented in Figures 4a and 4b are superimposed at the input of the tuned transformer 91, which may be considered the equivalent of a narrow band pass filter, passing a band of frequencies having 60 kc. as the median frequency and also the side bands 60.5 kc. and 59.5 kc. The three frequencies are the principal or most essential components of the 60 kc. modulated by 0.5 kc. currents.

The superimposed 60 kc. currents from the mixers 28 and 29, modulated in opposite phase by the 0.5 kc. currents, pass through tuned transformer 91 on the way to amplifier stages 42 and 43. Before these currents are combined at the input of transformer 91, they have the respective envelopes shown in Figures 4a and 4b as explained above. The resultant combined current through transformer 91 has the modulation envelope shown by the continuous lines in Figure 4c. An amplified copy of this current is delivered to the input of the rectifier 55 by amplifier stages 42 and 43. Accordingly, only the negative half waves of the varying intensity 60 kc. currents get through the rectifier 55 and they charge the condenser 39 negatively. This charge on the condenser 39 also fluctuates in intensity at the rate of 500 cycles per second; that is, the charge in condenser 39 builds up and down at that rate. Tube 30 produces an amplified current varying with the charge on condenser 39. The overall effect, with the condenser 41 interposed between the amplifier 30 and the grid of amplifier 59, is to impose an alternating electromotive force of a frequency of 500 cycles per second on the grid of amplifier 59.

In order that the oscilloscope may indicate average current in the phase sensitive detector rather than the instantaneous changes resulting from the continuous switching, the output is applied to the amplifier stage 30 then through a low pass filter system 35 which effectively removes the 500 cycle switching frequency but which permits relatively rapid changes in average current to be indicated. The resultant trace on the CRO screen does not show any deflection caused by the switching signal.

If the two incoming signal currents derived from transducer 10, each at 20 kc., are of equal intensity, then the curves of Figures 4a and 4b are alike, except for a 180° phase displacement of the modulation envelope. When the currents are added as in Figure 4c, the resultant is a 60 kc. current of uniform amplitude, the envelope of which consists of two parallel lines, such as p and p'. When the intensity is greater in Figures 4a (mixer 28) than in Figure 4b (mixer 29) the resultant is the continuous curves q and q' of Figure 4c. When the intensity is greater in Figure 4b (mixer 29) than in Figure 4a (mixer 28) the resultant is the dotted curves r and r' of Figure 4c.

The same alternating electromotive force from oscillator 34 mentioned heretofore is also applied to one terminal of the rectifier 53, which shunts off the positive half waves to ground. The negative half waves pass on and are applied on the grid of amplifier 59. The effect on amplifier 59 is to completely block the corresponding half waves from its output as controlled by the output from rectifier 55. Therefore, the output from amplifier 59 comprises only half waves of a frequency of 500 cycles, which are passed during the unblocked half cycles, as determined by the output of oscillator 34.

If the input currents from the input selectors are of equal intensity, no half waves get through, in other words the half waves are of zero intensity. If the input currents are of unequal intensity, the half waves from amplifier 59 will be positive or negative according to which current at the input of the circuit is greater. This is obvious by comparing the envelopes of Figures 4c, qq' and rr', and further by consideration of Figures 4d and 4e. The periodic blocking at the input of amplifier 59 cuts out the shaded parts of the output current, illustrated in Figures 4d and 4e, passing the negative half waves only.

If Figure 4a had been at the intensity of Figure 4b, but in the phase of Figure 4a; and if Figure 4b had been at the intensity of Figure 4a, but in the phase of Figure 4b; then the combined current would have had the envelope shown by the dotted lines r and r' in Figure 4c and this would have given a current at the output of amplifier 59, as shown in Figure 4e. If the same half waves are blocked in time as before, the unblocked half waves would now be positive as in Figure 4e instead of negative as in Figure 4d.

Thus, according to which has greater intensity at the inputs of mixers 28 and 29, the amplifier 59 will deliver negative or positive half waves. This output of amplifier 59 goes to the input of horizontal sweep amplifier 61.

One part of the output from amplifier 43 goes to rectifier 55, heretofore set forth, another part of the output of amplifier 43 goes through condenser 52 to rectifier 54. The output of rectifier 54 is smoothed by the condenser shown, and a voltage drop is established along resistances 37 and 38, and the drop through resistance 38 is applied to the grid of the cathode ray tube 62c.

The series resistance 37 permits limiting of voltage across rectifier 71 without limiting the voltage across rectifier 54. If the rectifier 54 were limited, distortion would be produced in the output of amplifier 43.

Any incoming currents at the mixers 28 and 29, whether equal or unequal, will add their effect at the input of rectifier 54 and put a positive charge on the grid to brighten the spot at a time when the signal is actually being received.

This invention as compared to that set forth in the copending application, heretofore mentioned, does away with four band pass filters and utilizes the tuned transformer 91 and a tuned circuit 51 between the amplifier stages 42 and 43. The four filters of the copending application have two different frequency ranges, two filters being centered on 7 kc. and two on 10 kc. (as presented by way of example in those cases). Not only must two filters of the same range be alike, but it is necessary that for the different ranges, the attenuation characteristics shall be alike over the two ranges or bands. Further, the two adjustable oscillators of 27 kc. and 30 kc. in the copending application must be closely tracked. All these conditions are matters of some difficulty in designing and building the system of the copending application.

In this invention, the two filters are at the same frequency and both are applied on the superimposed channels at the same basic high frequency, so that whatever a filter does to one channel, it does the same to the other channel. This invention employs only one adjustable oscillator where the copending application has two, hence there is no problem in the tracking of the oscillators.

This invention is simpler, quicker and easier to build and adjust, and it is less expensive than that of the copending application.

The output from amplifier 59 is coupled to the grid of a horizontal deflection amplifier 61, and a cathode ray oscilloscope 62 has its horizontal beam deflecting coils 62a connected in the cathode circuit of amplifier 61. A high bucking negative voltage from supply source 44 is applied to this cathode circuit through resistance 63 and there is also an adjustable negative voltage connected to the input grid of amplifier 61 through a potentiometer 64. When the latter is properly adjusted, the beam spot of the cathode ray tube 62 will be centered on the tube screen.

The vertical sweep of the electron beam in tube 62 is controlled by a vertical deflection amplifier 73, the output of which is connected to the vertical deflection coils 62b of tube 62. The vertical sweep of the beam spot is synchronized with pulse transmission from transducer 10 so that the beam spot will start its upward path at the same time that a pulse is projected from transducer 10. This is effected in part through contacts on relay 45 which as previously explained is energized simultaneously with relay 11.

The ends of the vertical sweep are determined respectively by a range start potentiometer 74 in the cathode circuit of amplifier 73 and a range potentiometer 75 which is connected in the grid circuit of amplifier 73.

Thus when relay 45 is energized to close contacts 45b and 45c, condensers 76–79 inclusive, will be discharged quickly to remove positive voltage from the grid of amplifier 73. The effect is to reduce the current through the vertical deflection coils 62b of tube 62 and shifts the electron beam down to its lowermost position as adjusted by the range start potentiometer 74. When the contacts of relay 45 reopen as the latter is deenergized, condensers 76–79 inclusive, will begin to charge again, placing a steadily increasing positive voltage on the grid of tube 73. The resulting steadily increasing current in the anode-cathode circuit of tube 73 flows through the vertical deflection coils 62b of tube 62 and thereby shifts the electron beam vertically from the bottom to the top of the tube screen. The speed of this vertical motion of the beam for any given position of range switch 81, is determined by adjustment of the range limit potentiometer 75.

Also when relay 45 is energized, closure of relay contacts 45c applies a high positive voltage from source 80 directly to an intensity potentiometer 82 instead of indirectly through resistance 83. This makes the cathode 62d of tube 62 more positive than before, thereby reducing the tube current. The effect is to reduce the intensity of the beam spot of the tube 62 when a pulse is projected and as it jumps back from the upper end of its range to the lower end.

*Operation*

Summarizing, the operation of the principal elements in applicant's novel system is as follows: Let it be assumed that a pulse of compressional wave energy is emitted from transducer 10, the directivity pattern of which corresponds to the pattern p in Fig. 3. If the pulse intercepts a target such as a submarine and is reflected back along axis Ow in Fig. 3, separate outputs in channels 15 and 16 will be obtained.

The outputs in channels 15 and 16 after passing through input transformers 21, 22 and amplifiers 25, 26 are then combined through lag line 27 to produce two resultant outputs, equivalent to a simultaneous shift of the normal directivity pattern $p$ to patterns $p'$ and $p''$, respectively. Thus for a pulse echo returning along axis $Ow$, the output level of the pulse echo in channel 15 at the input to mixer 28 will be equal to vector $Ot$ while that in channel 16 at the input to mixer 29 will be equal to vector $Os$.

Mixers 28 and 29 are modulated by 80 kc. oscillator 33, applied on the control grids and 0.5 kc. oscillator 34, applied on the screen grids. The 60 kc. and its side bands modulated by the 0.5 kc. are selected by tuned transformer 91 and applied to amplifiers 42 and 43.

At this point, time varied gain is applied to amplifiers 42, 43, and the output therefrom is divided, one part of which passes through rectifier 55 condensers 39 and 41 resulting in a 0.5 kc. alternating potential on the grid of amplifier 59. The other part passes through rectifiers 54 and 71 to the grid of the cathode ray tube. The grid of amplifier 59 is also supplied with rectified 0.5 kc. from oscillator 34 and rectifier 53, this current balances out the 0.5 kc. from rectifier 55, condensers 39 and 41, resulting in an output whose polarity is dependent upon the magnitude of the intensities of the echo in the halves $10a$ and $10b$ of transducer 10.

As previously described, the beam spot on the screen of tube 62 begins to move vertically upward at the time the pulse was projected from transducer 10. Therefore, taking into consideration the factor of time varied gain, the pattern on the screen of tube 62 will appear similar to that shown in Fig. 2 wherein left and right deflection of the beam spot due to reverberation is shown at 86 and deflection to the right of the center due to the pulse echo is shown at 87. This indicates to the operator that the true bearing of the target is somewhere to the right of the perpendicular $Ox$ to the face of the transducer 10.

In a similar manner, should the echo pulse return along an axis on the other side of the perpendicular $Ox$, the beam spot on the screen of tube 62 would be deflected to the left from the center of the screen.

In order to obtain the exact bearing of the target relative to the transducer, the operator rotates the transducer until no deflection of the beam spot due to an echo appears on the screen of the oscilloscope 62. As previously explained, this means that the intensities of the outputs received in both channels 15 and 16 at the inputs to mixers 28 and 29 are equal, corresponding to the vector $Or$ in Fig. 3, and hence that the echo pulse is returning to the face of the transducer along the same axis at which it was projected from the transducer, namely axis $Ox$. Under these conditions, the true bearing of the target relative to the transducer 10 is therefore the bearing which is coincident with the perpendicular to the face of the transducer.

The novel system which has been described may also be used for viewing on the screen of the cathode ray tube 62 the characteristics of any underwater compressional wave energy that may be emitted directly from a source as distinguished from an echo of a pulse projected from transducer 10. Such a source might be the wave energy produced by rotating propellers of a submarine.

In order to do this, outgoing pulses from transducer 10 are ceased and range switch 81 thrown to its extreme right position. With switch 81 in this position, the winding of relay 45 is placed in series with a voltage dropping resistor 84, and this series combination is in parallel with resistor 85, both these parallel branches being in series in relation to the anode of amplifier 73. Condensers 76 and 77 charge slowly and build down the negative voltage on the grid of amplifier 73. Accordingly the current through amplifier 73 and resistance 85 increases and the voltage drop across resistance 85 increases. At first this voltage drop is not sufficient to deflect enough current through the winding of relay 45 to pull in its relay contacts, but eventually these contacts close.

Until relay 45 closes, the increasing charge on condensers 76 and 77 causes the beam spot on the cathode ray tube 62 to move vertically upward. But when relay 45 closes, the effect is the same as its closure simultaneously with the projection of a pulse from transducer 10 as previously described. Accordingly the beam spot in the cathode ray tube 62 will travel repeatedly over its vertical course from bottom to top jumping back from the top to the bottom each time. The compressional wave energy input to transducer 10 from the external source such as the submarine's rotating propellers is processed through the two separate channels in the same manner as an echo pulse and produces voltages on the horizontal deflecting plates $62a$ of tube 62. The net result of this is that the beam spot is jogged both right and left as it travels upward producing a wavy track. The transducer 10 should be trained so that the jogs to the left and right are of about equal amplitude, this position indicating that the transducer 10 is on the exact bearing of the submarine.

The input selector switches 31 and 32 have four positions. Reading counter clockwise on switch 31, the top position provides for normal operation of the system in which the two overlapping directivity lobe patterns of the transducer 10 are established. The next two positions give patterns as seen by either the left-steered or right-steered lobes $p'$ and $p''$, and the bottom position is a test position for checking overall balance and adjustment of the two amplifier channels. Switch 32 is the same when read clockwise.

In conclusion, it is desired to point out that while the foregoing drawings represent preferred embodiments of the invention, still other changes may be made therein without departing from the spirit and scope of this invention as expressed by the appended claims. For example, the phase shifting introduced into the two sections of the transducer has been described as a lag network which retards the phase of the electrical quantities produced therein. However, since all that is needed is a relative shift in phase between the outputs of the two transducer sections, it is evident that a lead network to advance the phase of the electrical quantities produced in either section of the transducer will work equally well.

Further while it is preferred to use a single transducer structure in which the elements are divided into two equal sections, it is evident that substantially the same result may be obtained with the use of two separate transducers provided they are placed close enough to each other so that overlapping directivity lobe patterns may be created.

Having thus fully described my invention, I claim:

1. Apparatus for determining the direction of a source of wave energy comprising a pair of transducers disposed with their active faces coplanar, an output channel for each transducer, phase shifting means connected across said output channels whereby a phase shifted output from one of said output channels will combine with an unshifted phase output from the other of said output channels to produce a resultant output in each channel, means for modulating and then combining said resultant outputs into a common channel, means applying a time varied gain to said resultant outputs when in said common channel, means for obtaining the electrical difference between the outputs, phase responsive means for producing a signal proportional to said difference and oppositely phased for opposite signs, respectively, of said difference, a cathode ray oscilloscope, means for initiating a sweep of the ray beam in said oscilloscope, and means applying said signal to deflect said beam from its sweep path in opposite directions corresponding to said opposite phases.

2. Apparatus for determining the direction of a source of wave energy comprising a pair of transducers disposed closely adjacent each other and having their active faces coplanar, an output circuit for each transducer, phase shifting means connected in each output circuit, means combining a phase shifted output in each of said output circuits with an unshifted output from the other of said output circuits to produce two resultant outputs, means for modulating said outputs at a first and second frequency, means combining the resultant outputs into a common channel, means applying a time varied gain to said resultant outputs when in said common channel, means filtering out said first modulation frequency and passing said second frequency of modulated outputs, means for obtaining the electrical difference between said resultant modulated outputs of said second frequency, a cathode ray tube, a sweep circuit for the cathode ray beam thereof and means for applying said electrical difference to deflect said beam from its sweep path.

3. Apparatus for determining the direction of a source of wave energy comprising first and second similar transducers disposed closely adjacent each other and having their active faces coplanar, the directivity pattern of said transducers when combined directly having substantially a major lobe the axis of which is perpendicular to the transducer faces, an output circuit for each transducer, phase shifting means connected across said output circuits whereby a phase shifted output from each one of said output circuits will combine with an unshifted phase output from each of the other of said output circuits to produce two resultant outputs corresponding to a simultaneous shift in the axis of said lobe to both sides of said perpendicular axis, said lobes being overlapped, means including plural modulating means for converting said resultant outputs to outputs of different frequencies, means then combining last said outputs into a common channel, means for applying time varied gain to said outputs when in said common channel, means for blocking out all but one of said modulating frequencies and alternating half cycles of last said frequency, and means for comparing the amplitudes of the outputs in said separate channels.

4. Apparatus for determining the direction of a source of wave energy comprising a pair of transducers disposed with their active faces coplanar, an output channel for each transducer, a mixer for each channel, phase shifting means connected to said output channels and providing each said mixer with a phase shifted output from one of said output channels and an unshifted output from the other of said output channels, means modulating at a first and a second frequency said outputs in each of said channels, means combining the outputs from said mixers into a common channel amplifier, means applying a time varied gain to said outputs in said common channel amplifier, means for blocking out one of said modulating frequencies, means for obtaining the electrical difference of said outputs, a cathode ray oscilloscope, and means applying said output difference to the ray deflecting means in said oscilloscope.

5. Apparatus for determining the direction of a source of wave energy comprising a pair of transducers disposed closely adjacent each other and having their active faces coplanar, a transmitter oscillator, relay means for alternately connecting the output of said oscillator to said transducers and said transducers to separate tuned output channels therefrom, phase shifting means connected across said output channels whereby a phase shifted output from one of said output channels will combine with an unshifted phase output from the other of said output channels to produce a resultant output in each channel, means combining said resultant outputs into a common channel, means applying a time varied gain to said resultant outputs when in said common channel, means for obtaining the difference between said resultant outputs, phase selecting means including means cancelling said output difference in predetermined alternate half cycles thereof, a cathode ray oscilloscope, means synchronized with the operation of said relay means to initiate a sweep of the ray beam in said oscilloscope, and means applying said resultant output difference to deflect said beam from its sweep path in opposite directions corresponding, respectively, to opposite phases selected.

6. Apparatus for determining the direction of a source of wave energy comprising first and second similar transducers disposed closely adjacent each other and having their active faces coplanar, the directivity pattern of said transducers when combined directly having substantially a major lobe the axis of which is perpendicular to the transducer faces, a transmitter oscillator, relay means for alternately connecting the output of said transmitter oscillator to said transducers to emit a wave pulse and said transducers to separate output circuits therefrom, phase shifting means connected across said output circuits whereby a phase shifted output from each one of said output circuits will combine with an unshifted phase output from each of the other of said output circuits to produce two resultant outputs corresponding to a simultaneous shift in the axis of said lobe to both sides of said perpendicular axis, said lobes being overlapped, a pair of means including mixer means for modulating and combining said resultant outputs into a common channel, means synchronized with said relay means for applying time varied gain to said resultant outputs when in said common channel, means for blocking the alternate half cycles of modulation in the common channel from one of the modulating means, means deriving a voltage variable as the difference in the amplitudes of said resultant outputs, a cathode ray oscilloscope, means synchronized with said relay means to initiate a sweep of the ray beam in said oscilloscope and means for applying said variable voltage to deflect said beam from its sweep path when the echo of said transmitted wave pulse returns to the faces of said transducers at any angle other than a perpendicular thereto.

7. Apparatus for pictorially determining the direction of a source of wave energy comprising a pair of transducers disposed closely adjacent each other and having their active faces coplanar, phase shifting means connected in the output of each transducer, means combining a phase shifted output from each of said transducer output channels with an unshifted output from the other of said transducer output channels to produce two resultant outputs, means blocking alternate half cycles of said resultant outputs, phase discriminating means responsive to last said means for confining said half cycle outputs to positive and negative valves corresponding, respectively, to shifted and unshifted phases, means for obtaining the difference between the resultant half cycle outputs, and means for viewing said difference on a cathode ray means.

8. The method of combining, amplifying and comparing the outputs of two electrical channels wherein the polarity and intensity of the combined and amplified output is dependent upon the relative intensities in the two channels comprising, simultaneously mixing, shifting the electrical phase of one of said outputs, modulating with two different frequencies, and combining the resultant outputs in a single channel, selecting and amplifying the desired output frequencies from said single channel, blocking out one modulating frequency from said single channel, blocking therefrom alternate half cycles of modulated resultant currents whereby the resultant currents in each remaining half cycle in said channel have a polarity and intensity proportional to the electrical difference in intensities of the output of the two separate channels.

9. A circuit for comparing the output of two electrical channels wherein the polarity and intensity of the output of the combined channels is proportional to the relative intensities in the separate channels comprising, means for modulating each separate channel with two different frequencies, means for mixing and balancing the outputs of the separate channels into a single channel, means for selecting and amplifying the desired frequencies from the single channel, and means for blocking out all but one of the modulated frequencies and alternate half cycles of said one frequency, and phase discriminating means, whereby the output of the single channel has a phased polarity and intensity that is proportional to the electrical difference in intensities in the two channels.

References Cited in the file of this patent

UNITED STATES PATENTS

| | | |
|---|---|---|
| 2,143,035 | Smith | Jan. 10, 1939 |
| 2,166,991 | Guanella | July 25, 1939 |
| 2,167,492 | Sproule | July 25, 1939 |
| 2,251,708 | Hefele | Aug. 5, 1941 |
| 2,282,402 | Hefele | May 12, 1942 |
| 2,355,502 | Barton | Aug. 8, 1944 |